United States Patent Office 3,182,099
Patented May 4, 1965

3,182,099
PRODUCTION OF POLYMERIC MATERIALS FROM POLYOXYALKYLENE POLYOLS AND CYCLO-ALIPHATIC POLYEPOXY COMPOUNDS
Jared W. Clark, Charleston, and Alfred E. Winslow, Scott Depot, W. Va., assignors to Union Carbide Corporation, a corporation of New York
No Drawing. Filed Apr. 28, 1961, Ser. No. 106,153
22 Claims. (Cl. 260—830)

This invention relates to a process for the production of synthetic polymeric hydroxyl-containing products of high molecular weight and to the products produced thereby as new compositions of matter. More particularly, this invention relates to the process for the production of such products by the reaction of a long chain polyoxyalkylene polyol with a cycloaliphatic diepoxy compound. The products made by this invention are hydroxyl-containing products of high molecular weights, which can range in consistency from soft, waxy materials to rigid, resinous solids, and which may be water-soluble or water-insoluble, depending primarily upon the amount of particular diepoxy compound employed in their preparation as hereinafter described.

These compounds are particularly useful as lubricants for molding and extruding operations, dispersing agents, thickeners, suspending agents, coagulating agents for aqueous suspensions, surface-active agents, and as coating, textile sizing, binding, laminating, and casting compositions.

According to the present invention, a long chain polyoxyalkylene polyol, preferably a polyoxyalkylene glycol having an average molecular weight of at least 600 is reacted with a cycloaliphatic diepoxy compound having two oxirane epoxy groups in which the oxirane oxygen is bonded to adjacent carbon atoms of a cycloaliphatic ring, in the presence of a catalyst, preferably a Friedel-Crafts catalyst.

The polyoxyalkylene polyols which are useful in this process are commonly produced by the polymerization of an alkylene oxide having terminal epoxy groups, such as ethylene oxide, propylene oxide, butylene oxide, and the like, on an aliphatic or an aromatic compound having preferably at least two primary hydroxyl groups, but which may contain one or more secondary hydroxyl groups. Such compounds as may be used to prepare these polyols are ethylene glycol, propylene glycol, glycerol, diethylene glycol, sorbitol, sucrose, and like polyhydroxyl compounds. Preferred in this reaction are the linear chain polyoxyalkylene glycols represented by the general formula:

$$H-O(RC_2H_3-O)_n-H$$

wherein R is a member selected from the group consisting of hydrogen and lower alkyl groups having from one to three, inclusive, carbon atoms, and $n$ is an integer such that the average molecular weight of the polyglycol chain is at least 600.

Preferred of this group are the polyoxyethylene glycols and polyoxypropylene glycols having an average molecular weight of between about 1000 and about 10,000, and more particularly preferred are the polyoxyethylene glycols.

Since these polyoxyalkylene glycols are prepared by a polymerization of the alkylene oxides, they are composed of a mixture of polyglycols of various molecular weights, to which mixtures have been assigned an average molecular weight. The determination of the average molecular weight assigned to these mixtures is ascertained by known methods of determining physical and chemical properties. For the higher members of this class of polyglycols our preferred method of assigning average molecular weights is according to a reduced viscosity measurement of a solution containing 0.20 gram of the polyoxyalkylene glycol in 100 ml. of acetonitrile and for the lower members of this class we prefer esterification or acetylation methods. Reduced viscosity of the polyglycols is determined according to the following formula:

$$\text{Reduced viscosity} = I_R = \frac{I - Io}{Ioc}$$

where $I$=viscosity of solution
$Io$=viscosity of solvent
$c$=concentration in grams per 100 ml. solvent Average molecular weight of the polyglycol is then assigned according to the reduced viscosity. For example, a polyoxyethylene glycol having a reduced viscosity in acetonitrile at 30° C. determined in the above manner of about 0.17 has been assigned an average molecular weight of about 6000 and a polyoxyethylene glycol solution having a reduced viscosity of 0.08 determined in the same manner has been assigned an average molecular weight of about 4000. A polyoxyethylene glycol solution having a reduced viscosity of about 0.02 determined in the same manner has an assigned molecular weight of about 1000, but with the materials exhibiting such low reduced viscosities, we prefer to make the determination of molecular weight by an esterification method.

This method briefly consists of esterifying a 7½ gram sample of the polyoxyethylene glycol (dissolved in pyridine to make 25 ml.) by the addition of 25 ml. of a solution prepared by dissolving 42 grams of phthalic anhydride in 300 ml. of freshly distilled pyridine. After heating to about 98° C. for 30 minutes, the samples are cooled and 50 ml. of 0.5 N sodium hydroxide added. The same procedure is followed on a blank containing no polyglycol. Samples and blanks are titrated to a neutral end point with additional 0.5 N sodium hydroxide. Average molecular weight is then calculated according to the formula:

$$\text{Avg. mole. wt.} \frac{2000 \times S}{(B-A) \times N}$$

where $A$=ml. of N normal NaOH for sample
$B$=ml. of N normal NaOH for blank
$S$=original sample weight in grams The diepoxy compounds suitable for use in preparing the polymeric products of this invention are cycloaliphatic compounds containing two oxirane epoxy groups wherein the oxirane oxygen is bonded to adjacent carbon atoms of a cycloaliphatic ring. Preferably, the oxirane epoxy groups are the sole reactive groups under the conditions of the reaction. By the term "sole reactive groups," we mean to exclude compounds containing carboxyl, hydroxyl, phenolic, amino, amido, imido, and mercapto groups which have been found to be reactive under the conditions of the reaction with hydroxyl groups, or with epoxy groups, and will thus interfere with the desired condensation. These diepoxy compounds can be derivatives of cycloalkanes, cycloalkyl ethers, and cycloalkyl esters, having the epoxy groups on one or two separate or fused ring nuclei, and can contain non-interfering substituent groups such as alkyl, organic ester, phosphate ester, halogen, cyano groups, and the like without interfering with the condensation. Olefinic unsaturation of the polyepoxy compound can also be present.

The preferred cycloaliphatic polyepoxy compounds are those composed only of carbon, hydrogen, and oxygen wherein oxygen is present only in oxirane, ether, and ester arrangement, and having as the sole reactive groups under the conditions of the reaction two oxirane epoxy groups in which each oxirane oxygen is bonded to adjacent carbon atoms of separate cycloaliphatic rings. Particularly preferred of this group are the diepoxy compounds wherein the oxirane oxygen atoms of the epoxy groups are bonded to adjacent carbon atoms of separate cycloaliphatic rings having from 5 to 6, inclusive, carbon atoms. Illustrative of these preferred compounds are dicyclopentadiene diepoxide, bis(2,3-epoxycyclopentyl)ether, the 3,4-epoxycyclohexylmethyl 3,4-epoxycyclohexanecarboxylates and related compounds, such as 3,4-epoxy-methylcyclohexylmethyl 3,4-epoxy-methylcyclohexanecarboxylate, with the methyl group in the 1, 2, 3, 4, or 6 position of the cyclohexyl ring, as disclosed in U.S. Patent 2,716,123, issued August 23, 1955, and U.S. 2,890,195, issued June 9, 1959, the alkane diol bis-(3,4-epoxycyclohexanecarboxylate) compounds such as ethylene glycol bis-(3,4-epoxycyclohexanecarboxylate), diethylene glycol bis-(3,4-epoxycyclohexanecarboxylate), triethylene glycol bis-(3,4-epoxycyclohexanecarboxylate), 2-ethyl-1,3-hexanediol bis - (3,4 - epoxycyclohexanecarboxylate), 3-methyl-1,4-pentanediol bis-(3,4-epoxycyclohexanecarboxylate), 2-methoxymethyl-2,4-dimethyl-1,5-pentanediol bis-(3,4-epoxycyclohexanecarboxylate), and such other related compounds, as disclosed in U.S. 2,745,847, issued May 15, 1956, U.S. 2,853,498 and U.S. 2,853,499 issued September 23, 1958, the bis-(3,4-epoxycyclohexylmethyl)esters of dicarboxylic acids, such as bis-(3,4-epoxycyclohexylmethyl) pimelate, bis-(3,4-epoxycyclohexylmethyl) adipate, bis-(3,4-epoxycyclohexylmethyl)oxalate, bis-(3,4-epoxycyclohexylmethyl) maleate, and such other related compounds, as the alkyl substituted (3,4-epoxycyclohexylmethyl) esters as disclosed in U.S. 2,750,395 issued June 12, 1956, and similar diepoxides having two of these cycloaliphatic epoxide groups or one or two cyclic nuclei, such as 4, vinylcyclohexene diepoxide, diepoxycyclohexane and diepoxycyclooctane. Two or more of these diepoxy compounds can be employed, either in admixture or by successive reaction if desired.

These diepoxy compounds function in this invention primarily as chain extenders between polyoxyalkylene polyol chains and secondarily as cross-linking agents. According to our experience, the epoxy groups on the cycloaliphatic ring are opened and reacted with primary hydroxyl groups of the polyoxyalkylene polyol chains to link up two polyol chains, leaving the cycloaliphatic ring and the residue of the polyepoxy compound intact. The initial chain-extending reaction can be represented by the following scheme, shown here for purposes of illustration only with a polyoxyethylene glycol and a 6-member ring cycloaliphatic diepoxy compound

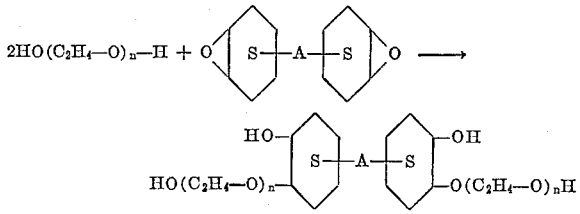

Where A represents the residue of the polyepoxy compound and $n$ is an integer such that the molecular weight of the polyglycol is at least 600. Thus, it is seen that the initial polymeric product is formed by condensation of hydroxyl groups of the polyol with epoxy groups of the polyepoxy compound.

Additional amounts of the diepoxy compound will, in a similar manner, react with other primary hydroxyl groups or with the secondary hydroxyl groups thus created. While the primary hydroxyl groups appear to react preferentially, the concentration of primary groups decreases as the reaction proceeds and the concentration of secondary groups increases. Cross-linking between polymeric chains is promoted by the reaction of the secondary hydroxyl groups. Thus, it is possible under this invention to obtain products having average molecular weights many fold over those of the starting polyoxyalkylene polyol. These products may be chain products substantially linear in structure or may be cross-linked products, depending primarily upon the molar ratio of diepoxy compound to polyoxyalkylene polyol employed in their preparation.

Products which are primarily linear in structure and derived from polyoxyethylene glycols exhibit a high degree of water-solubility. With an increase in the degree of cross-linking present in the product, the water-solubility decreases. We have found that products can be prepared having three or more times the average molecular weight of the starting polyglycol compound and still be water-soluble.

When the polyoxyalkylene polyols having secondary hydroxyl groups are employed in this reaction, the reaction of the epoxy groups follows the same mode, with primary hydroxyl groups reacting preferentially to link up polyoxyalkylene polyol chains. Cross-linking can also take place by the reaction of the original and/or created secondary hydroxyl groups to produce similar products to those made from the polyglycols.

The cycloaliphatic diepoxy compounds can be used in the process of this invention in amounts from about 0.2 mole to about 20 moles per mole of the polyoxyalkylene polyol to produce our useful products. We have found that products made using over 20 moles of the diepoxy compound per mole of the polyol do not exhibit desirable properties. They are extremely brittle and are of little commercial value. Products made using less than about 0.2 mole of diepoxy compound per mole of polyol likewise do not exhibit desirable properties of the compositions of this invention and are not considered a part thereof. The products of this invention vary from water-soluble, soft, waxy or gum-like materials having good lubricating, suspending, and thickening properties in the lower molecular concentrations of diepoxy compound employed in the reaction, to rigid, water-insoluble resinous solids suitable for molding, casting, and machining in the higher molecular concentrations of diepoxy compound employed.

The temperature at which the reaction of the diepoxy compound with the polyol is carried out is not narrowly critical and can range from about 25° C. up to 250° C. It is preferred that the reaction be carried out with the polyol in the liquid state but below the decomposition temperature of the reactants and products. For most reactions, a temperature of 50° C. to about 150° C. is preferred. Inert diluents or solvents can be employed to enable mixing of the reactants at temperatures below the melting point of the polyglycol. Such inert solvents as dioxane, the diethyl ethers of ethylene glycol and diethylene glycol, and benzene, toluene, and xylene can be employed for this purpose. It is preferred in this process that less than 50 percent of the reaction mixture constitute the solvent, and more advantageously between about 10 to about 40 percent.

The reaction is conveniently carried out at atmospheric pressure, although pressures both above and below atmospheric can be employed. It is desirable to exclude air during the reaction by employing an inert atmosphere such as nitrogen to cover the reaction mixture to prevent or inhibit any degradation of the product or deactivation of the catalyst.

We have found that the compounds which serve to promote the condensation of the diepoxy compound with the polyoxyalkylene polyol are the Friedel-Crafts catalysts, such as the halides of boron, aluminum, zinc, iron, and tin, and like catalysts, and the alkali metal alcoholates of the polyoxyalkylene polyols such as are prepared from the alkali metals, their oxides and hydroxides. These catalysts are effective in amounts of at least 0.005 percent by weight of the polyol employed, and preferably in amounts of between about 0.1 percent and 0.5 percent by weight. Friedel-Crafts catalysts, particularly boron trifluoride and stannic chloride, are preferred in that they result in a more rapid reaction of the cycloaliphatic diepoxy compound with the polyol. Boron trifluoride can be employed either as a gas or as a complex, with, for example, diethyl ether or monoethylamine.

By the term "alkali metal alcoholates of the polyoxyalkylene polyols," we mean polyoxyalkylene materials where one or more of the hydroxyl groups are converted to an alkali metal alcoholate ground by the reaction of the polyol with catalytic amounts of an alkali metal, alkali metal oxide, alkali metal hydroxide, alkali metal hydride, alkali metal alcoholate and the like.

It is not critical to the operation of our invention that these alkali metal alcoholates of the polyglycol or polyol be prepared in any particular manner. The presence of any of the above alkali metal alcoholate forming compounds mentioned above with the polyol is sufficient to cause reaction, although the application of mild heat is advantageous for faster reaction. The alcoholate of the polyol can be prepared in situ by adding the alkali metal alcoholate forming compound to the polyol immediately prior to the reaction with the polyepoxy compound or the alcoholate of the polyol may be made elsewhere and stored until used in this process.

We have also found that minor amounts of water in the reaction mixture can be tolerated so that aqueous solutions of the alkali metal hydroxides can be employed as the alcoholate forming compound with excellent results. Sodium and potassium hydroxides are the preferred alcoholate forming compounds in this process. It is not necessary, and in fact not desirable to employ the alcoholate forming compound in amounts theoretically necessary to convert all hydroxyl groups of the polyol to alcoholate groups. Amounts of the alkali metal alcoholate forming compound of as low as about 0.05 percent by weight of the polyol have been found effective in converting sufficient hydroxyl groups of the polyol to alcoholate groups for promoting the reaction, with amounts of about 0.1 percent to about 0.5 percent (by weight) being preferred although greater amounts can be used.

The order for adding the reactants and catalyst is not critical in the operation of this process. One reactant can be added to a mixture of the other reactant and the catalyst, or the catalyst can be added to a mixture of the two reactants. The addition may be continuous, in small successive amounts, or in one large amount.

It is, of course, permissible to interrupt the reaction by adding a chain stopping agent, or by neutralizing the reaction mixture. When employing the Friedel-Crafts type catalyst, a base, for instance sodium hydroxide, can be used to neutralize the acid catalyst and stop the reaction. Likewise an acid such as phosphoric acid can be used to neutralize the alkaline catalysts when they are employed. Such methods are particularly useful in controlling the physical properties or molecular weight of the products.

Our preferred method of making the water-soluble high molecular weight products consists of heating a polyoxyethylene glycol having an average molecular weight of about 6000 to a temperature of about 65° C.–100° C. in an atmosphere such as nitrogen, and dissolving in it about 0.2 to about 0.5 percent by weight of the polyglycol of boron trifluoride added as an anhydrous gas or as an etherate complex. Reaction takes place when about one to four moles of a cycloaliphatic diepoxy compound per mole of the polyoxyethylene glycol is thoroughly mixed in the polyglycol-catalyst mixture. A rise in viscosity is evident in about 5–10 minutes, indicating formation of higher molecular weight polymeric materials. The catalyst need not be removed from the reaction mixture, although if desired, it can be neutralized with a base such as sodium hydroxide when the desired viscosity is reached.

These products are waxy or gum-like in appearance, soluble in water and acetonitrole, and appear from their characteristics to be predominantly linear polymetric products. The products have good lubricating qualities, and serve efficiently as suspending, thickening, dispersing, and coagulating agents for aqueous solutions and the like. Aqueous solutions of these wax-like products can be made having a very high viscosity. The products are easily flaked and granulated in conventional resin handling equipment. Aging of the water-soluble, waxy products does not significantly affect their water-solubility or other physical properties.

Our preferred process for making the water-insoluble resinous products consists of heating a polyoxyethylene glycol having an average molecular weight of about 6000 to a temperature of about 65° C–100° C. in an inert atmosphere such as nitrogen and dissolving in it 0.2 to 0.5 percent by weight of boron trifluoride as an anhydrous gas or as an etherate complex. Reaction takes place when at least four moles and preferably about five moles or more of the cycloaliphatic diepoxy compound per mole of polyoxyethylene glycol are thoroughly mixed with the glycol-catalyst solution. Reaction is rapid and the product can be immediately cast in a mold. It is preferred that the resin be cured by heating in an oven at about 80° C.–100° C. for 2–20 hours to assure complete reaction, although slow curing does take place at room temperature.

These rigid resinous products are insoluble in water and acetonitrile, being somewhat flexible and having high impact strengths and low brittle temperatures in the lower concentrations of polyepoxy compounds employed, and are substantially cross-linked. With the preferred diepoxy compounds, such as 3,4-epoxy-methylcyclohexylmethyl 3,4-epoxymethylcyclohexanecarboxylate, it has been found that the water insoluble resinous materials are made using about five or more moles of diepoxy compound per mole of polyglycol, and the preferred water-soluble compounds are made using less than four moles of diepoxy compound.

However, as with most polymerization products, no exact line of demarcation exists between the soluble and insoluble products in relation to molecular concentration of polyepoxy compound used. Thus a high-impact strength resin, substantially insoluble in water, can be obtained with less than about five moles of diepoxide per mole of polyglycol, which is still slightly flexible although easily machined. Rigid resins can be prepared by the use of higher ratios of polyepoxy compound to polyglycol with consequent increase in the degree of cross-linking. The cross-linked structures have improved dimensional stability and high impact strengths, and are suitable for molding or casting in plaques, sheets or non-planar forms. The rigid resins are easily machined, or can be cast into various shapes, being dimensionally stable over a wide temperature range.

This application is a continuation-in-part of our application Serial No. 540,636, filed October 14, 1955, now U.S. Patent 2,990,396.

The following examples are illustrative. Unless otherwise specified, all parts and percents are by weight.

*Example 1*

To 1000 grams of a melted polyoxyethylene glycol having an average molecular weight of about 6000, five grams of boron trifluoride-diethyl ether complex containing 47 percent boron trifluoride was slowly added at a temperature above the melting point of the polyoxyethylene glycol in a nitrogen atmosphere. This mixture was allowed to cool to room temperature and kept for 48 hours.

To another 600 grams of this polyoxyethylene glycol having an average molecular weight of about 6000, which was melted in a nitrogen atmosphere at a temperature of about 65° C., 60 grams of 3,4-epoxy-6-methylcyclohexylmethyl 3,4 - epoxy - 6 - methylcylohexanecarboxylate was added. The mixture was allowed to cool to room temperature. A 35 gram portion of the first polyoxyethylene glycol mixture containing the boron trifluoride catalyst was remelted in an inert atmosphere at 86° C. and a 57 gram portion of the polyoxyethylene glycol containing the dissolved 3,4-epoxy-6-methylcyclohexylmethyl 3,4-epoxy-6-methylcyclohexanecarboxylate was added and stirred until it dissolved. This mixture gave a reactant molar ratio of 1.28:1 of the polyepoxy compound to the polyoxyethylene glycol. A noticeable increase in viscosity was observed in about one minute after the addition of the glycol-polyepoxy reactant. After holding the reaction mixture at a temperature of about 86° C.–78° C. for six minutes, it was allowed to cool to room temperature and solidify.

The solid waxy product was soluble in water. A solution of 0.20 gram of the product in 100 ml. of acetonitrile had a reduced viscosity of 0.27 at 30° C. The product had a melt viscosity at 100° C. of 17,500 centipoises. A solution containing 50 grams of the product in 150 grams of water had a viscosity at 30° C. of 82 centipoises.

*Example 2*

A diepoxide, bis(2,3-epoxyclcyopentyl)ether, was prepared for reaction by epoxidizing the known bis(2-cyclopentenyl)ether in the following manner:

To a 338 gram sample of the bis(2-cyclopentenyl) ether (2.25 moles) having a boiling point of 80° C. at 10 mm. pressure and a refractive index $n_D^{30}$ of 1.4857, there was added 3081 grams of a 22.2 percent solution in acetone of peracetic acid (9.0 moles) as the epoxidizing agent in a dropwise manner over a five hour period, while the temperature of the reaction was maintained at 25° C.–35° C. Stirring was continued for an additional day after the peracetic acid and acetone were added, and the mixture maintained at room temperature. Titration of the peracetic acid at this time indicated the epoxidation reaction had proceeded to 95 percent completion.

The reaction mixture was fed into a still kettle containing boiling ethylbenzene, and the acetone, excess peracetic acid, and acetic acid were removed as a distillate, leaving the bis(2,3-epoxycyclopentyl)ether as a residue product. The residue was distilled under vacuum, and a 320-gram semi-solid fraction containing the bis(2,3-epoxycyclopentyl)ether, boiling at 107° C. at 2.1 mm. Hg. pressure was obtained. Recrystallization of this fraction from ethylbenzene gave colorless crystals identified as bis-(2,3-epoxycyclopentyl) ether having a melting point of 56° C.–57° C. Elemental analysis for $C_{10}H_{14}O_3$, calculated, 65.91% C, 7.74% H; found 65.88% C, 7.81 H. An analysis for epoxide by the pyridine hydrochloride method indicated a purity of 96 percent.

*Example 3*

To 500 grams of a polyoxyethylene glycol having an average molecular weight of about 6000, maintained in an atmosphere of nitrogen at about 65° C., there was slowly added 3.3 grams of aqueous 50 percent potassium hydroxide with stirring until the potassium hydroxide all dissolved. The reaction mixture was cooled to room temperature and stored overnight.

A 108 gram sample of the mixture was then remelted in a nitrogen atmosphere while stirring and then heated to about 100° C. when 4.64 grams of the bis(2,3-epoxycyclopentyl) ether as prepared in the manner described in Example 2 was added. This amount corresponds to a molar ratio of 1.42:1 of the diepoxy ether to polyoxyethylene glycol. The reaction temperature was maintained between 88° C. and 110° C. during the following nine hours. Two 0.7 gram portions of 50 percent aqueous potassium hydroxide catalyst were added at reaction times of 0.5 hour and 8.5 hours, figured from the time of addition of the polyepoxy compound. The product was allowed to cool to room temperature and solidify.

One gram of the solid wax-like product was dissolved in 30 grams of acetonitrile, and traces of insoluble gel were removed by filtration. The filtrate was dried in vacuo at room temperature overnight. A solution prepared by dissolving 0.20 gram of this dried material in 100 ml. of acetonitrile had a reduced viscosity of 0.28. A solution prepared by mixing 10 grams of the solid reaction product with 290 grams of water contained a small amount of insoluble gel, estimated to be 0.24 gram.

*Example 4*

An alkane diol bis(3,4-epoxycyclohexanecarboxylate) was prepared for reaction in the following manner.

To 157 grams of 2-ethyl-1,3-hexanediol bis(3-cyclohexanecarboxylate) (0.434 mole) there were added dropwise over a period of one and one-half hours, 338 grams of 24.5 percent solution of peracetic acid in acetone (83 grams, 1.095 moles of peracetic acid). The reaction solution was stirred and kept at 22° C.–25° C. by immersing the reaction flask in a cool water bath. After the addition was complete, the reaction conditions were maintained the same for four and one-half hours longer and then the solution was stored at −11° C. for 16 hours. Analysis at the end of this time indicated 94 percent of the theoretical amount of peracetic acid had been consumed.

The reaction solution was then added dropwise to a still kettle containing 500 grams of ethylbenzene refluxing at 55° C. at 35 mm. Hg pressure, and during addition, acetic acid, peracetic acid, acetone, and ethylbenzene were distilled off at the top of the kettle. After addition was complete, all low-boiling constitutents were stripped off up to a temperature of 90° C. at 3 mm. Hg pressure. There was obtained, as a residue product, 166 grams of a hazy viscous liquid which analyzed 86.8 percent as 2-ethyl - 1,3 - hexanediol bis(3,4 - epoxycyclohexanecarboxylate) by analysis for epoxide groups and 10.2 percent as unreacted 2-ethyl-1,3-hexanediol bis(3-cyclohexenecarboxylate) by analysis for double bonds. The yield of diepoxide product was 8.3 percent of theory.

Other alkane diol bis(3,4-epoxycyclohexanecarboxylates) can be prepared in a like manner by epoxidizing the appropriate alkanediol bis-(3-cyclohexenecarboxylate) in the manner disclosed in U.S. 2,745,847.

*Example 5*

To 50 grams of a polyoxyethylene glycol having an average molecular weight of about 6000 and maintained at about 125° C. without exclusion of air, there was added 0.50 gram of boron trifluoride-monoethylamine complex containing 60 percent boron trifluoride by weight, which, with manual stirring, dissolved almost immediately. At this time there was added 9.50 grams of 2-ethyl-1,3-hexanediol bis(3,4-epoxycyclohexanecarboxylate) prepared as in Example 4, which, after a minute's stirring, formed a homogeneous solution with the previous two components. This amount corresponds to a molar ratio of about 2.9:1 of the diepoxy compound to polyoxyethylene glycol. After maintaining the reaction temperature at 125° C. for 18 hours, the amber colored, translucent reaction mixture was a very viscous mass. The product was allowed to cool to room temperature and solidify, to a hard, tough, wax-like product.

A solution prepared by dissolving 0.20 gram of the product in 100 ml. of acetonitrile had a reduced viscosity of 0.40 at 30° C. The reduced viscosity of the polyoxyethylene glycol starting material in acetonitrile at 30° C. was 0.17. A solution prepared by dissolving 42.85 grams of the reaction product in 128.5 grams of water had a viscosity of 16,360 centistokes at 100° F.

*Example 6*

To 100 grams of a polyoxyethylene glycol having an average molecular weight of about 6000, heated to a temperature of 125° C., there was added 1.0 gram of boron trifluoride-monoethylamine complex which was dissolved by stirring, and 38.0 grams of 2-ethyl-1,3-hexanediol bis-(3,4-epoxycyclohexanecarboxylate) prepared as in Example 4 with stirring to form a homogeneous solution. These amounts correspond to a molar ratio of about 5.8:1 of the diepoxy compound to polyoxyethylene glycol. The solution was evacuated in an oven for 15 minutes with conditions of 60° C. and 3 mm. Hg absolute pressure to eliminate the formation of bubbles in the next step. The vacuum-treated solution was then poured into a 6 x 6-inch mold of about 60 mils thickness, the mold having been previously heated to a temperature of 25° C. The reaction mixture was maintained in this mold at a temperature of 125° C. for a continuous period of 24 hours, whereupon it was allowed to cool to room temperature.

A light yellow, translucent plaque which was tough and strong was obtained by dismantling the steel mold. Mechanical properties for this material were as follows: tensile strength, 1400 p.s.i.; elongation, 210 percent; load at 100 percent elongation, 1400 p.s.i.; ASTM stiffness modulus 29,800 p.s.i.; $T_f$, −10° C.; $T_4$, +39° C.; brittle temperature, +12° C.; shore hardness A, 43. ($T_f$ on an ASTM torsional stiffness curve corresponds to a point at 135,000 p.s.i. and $T_4$ corresponds on the same curve to a point at 10,000 p.s.i.)

When 0.5092 gram of the product was extracted for 48 hours by mixing the sample with 106 grams of water at room temperature by rotation on can rolls, the swelled sample weighed 5.2880 grams; drying of this sample to a constant weight of 0.4623 gram during approximately 18 hours at 125° C. indicated that the original sample contained 90.8 percent of water-insoluble material. Extraction of 0.5056 grams of the reaction product in 105 grams of acetonitrile by the same procedure yielded 5.1610 grams of swollen gel which, when dried to constant weight at 125° C. during approximately 18 hours yielded 0.3335 gram or 66.0 percent of acetonitrile-insoluble material based on the original sample weight.

*Example 7*

To 530.7 grams of a polyoxyethylene glycol having an average molecular weight of about 1000 there was added 1.3 grams of boron trifluoride (added as the diethyl ether complex containing 47 percent boron trifluoride), and 532 grams of anhydrous toluene were thoroughly mixed with the above ingredients in a 2-liter reaction flask to dissolve the glycol and boron trifluoride catalyst. The mixture was heated to 58° C. with stirring and 150 grams of bis-(2,3-epoxycyclopentyl) ether as prepared in Example 2 was added. This amount corresponds to a molar ratio of about 1.5:1 of the diepoxy ether to polyoxyethylene glycol. The reaction temperature rose to 102° C. and was maintained at 100° C.–102° C. for three hours. At the end of this period 1.8 grams of 50 percent aqueous solution of sodium hydroxide was added to neutralize the reaction mixture and the mixture cooled to 40° C. Toluene was distilled off under reduced pressure to a final pressure of 2 mm. and temperature of 120° C.

The resultant residue product was completely water-soluble and a five percent aqueous solution of the product had a pH of 7.15. The reduced viscosity of a solution of 0.2 gram of product in 1,000 ml. of acetonitrile at 30° C. was 0.098. A 25 percent aqueous solution had a viscosity of 12.6 centistokes at 100° F. The product was a water-soluble wax-like material.

*Example 8*

To 500 grams of a polyoxythylene glycol having an average molecular weight of about 1000 contained in a sigma-blade mixer there was added 2.13 grams of boron trifluoride (added as the diethyl ether complex containing 47 percent boron trifluoride). The glycol and catalyst were mixed and heated to 42° C., at which temperature 125 grams of 3,4 - epoxy - 6 - methylcyclohexylmethyl 3,4-epoxy-6-methylcyclohexanecarboxylate was added with continuous mixing. This corresponds to a molar ratio of 0.89:1 of polyepoxy compound to polyglycol. The reaction of the diepoxide with the glycol was immediate and the reaction temperature rose to 82° C. during a five-minute period. Thirty minutes later, 2.6 grams of 50 percent aqueous sodium hydroxide was added to adjust the pH of the reaction mixture to 7.45 and 0.15 gram of 75 percent orthophosphoric acid was added to adjust the pH to 7.25.

The product was a water-soluble, wax-like material, with aqueous solutions containing traces of insoluble gel. A 25 percent aqueous solution had a viscosity of 30.9 centistokes at 100° F.

*Example 9*

A bis(3,4-epoxycyclohexylmethyl) ester of a dicarboxylic acid was prepared in the following manner.

Ninety-four pounds of bis(6 - methyl-3-cyclohexenylmethyl) adipate and 35 grams of Victawet 35B, an organic phosphate stabilizer available from the Victor Chemical Works, having the formula $$Na_5(2\text{-ethylhexyl})_5(P_3O_{10})_2$$

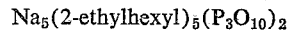

were placed in a 60-gallon, stainless steel, jacketed kettle having a turbine-type agitator. There were added continuously with stirring over a period 3.7 hours 204.0 pounds of a 23.2 percent solution of peracetic acid in ethyl acetate. The reaction was exothermic and the reaction solution was maintained at 36° C. to 41° C., during the addition and for 3.8 hours more by cooling with water circulating in the jacket as required.

To remove ethyl acetate, acetic acid, and unreacted peracetic acid, the reaction solution was then fed to two continuous strippers in series. The first was operated at 70 mm. Hg pressure and a jacket temperature of 126° C. to 146° C.; the second was operated at 1 mm. pressure, and 108° C. to 121° C. After six hours, a total of 96.2 pounds were obtained of light colored residual product analyzing 88.6 percent as bis(6-methyl-3,4-epoxycyclohexylmethyl) adipate by analysis for epoxide groups and 2.0 percent as unreacted bis(6-methyl-3-cyclohexylmethyl)adipate by analysis for unsaturation. The yield of the diepoxide was 80 percent of theoretical.

When approximately 15 pounds of this product were distilled in a continuous stripper operating at 1 mm. Hg pressure and a jacket temperature of 325° C., eight pounds of distillate were obtained analyzing 92.8 percent as bis-(6-methyl-3,4-epoxycyclohexylmethyl) adipate by analysis for epoxide groups.

Other epoxy esters of dicarboxylic acids are prepared in a like manner by epoxidizing the appropriate unsaturated cycloaliphatic ester of a dicarboxylic acid.

*Example 10*

To a solution prepared by dissolving 0.50 gram of boron trifluoride-monoethylamine complex in 50.0 grams of a polyoxyethylene glycol having an average molecular weight of about 6000 previously heated to a temperature of 125° C. there was added 9.50 grams of bis(3,4-epoxy-6-methylcyclohexylmethyl) adipate prepared as in Example 9, with stirring to form a homogeneous solution. These amounts correspond to a molar ratio of about 2.9:1 of the diepoxy compound to polyoxyethylene glycol. After maintaining the reaction temperature at 125° C. for 18 hours, the very viscous, amber colored, translucent product was allowed to cool to room temperature and solidify.

A solution prepared by dissolving 0.20 gram of the tough, hard, wax-like product in 100 ml., of acetonitrile had a reduced viscosity of 0.29 at 30° C. The reduced viscosity under the same conditions of the original polyoxyethylene glycol was 0.17. A solution formed by dissolving 43.10 grams of the reaction product in 129.3 grams of water had a viscosity of 1,330 centistokes at 100° F.

In a parallel experiment, to a solution prepared by dissolving 0.50 gram of boron trifluoride-monoethylamine complex in 50.0 grams of a polyoxyethylene glycol with average molecular weight of about 6000 previously heated to a temperature of 125° C., there was added with stirring 13.3 grams of bis(3,4-epoxy-6-methylcyclohexylmethyl)-adipate to form a homogeneous solution. These amounts correspond to a molar ratio of 4.0:1 of the diepoxy compound to polyoxyethylene glycol. After maintaining the reaction temperature at 125° C. for 18 hours, the solution had become a translucent, amber gel-like material which was allowed to cool to room temperature and solidify.

When 0.20 gram of the tough, hard, wax-like product was agitated at room temperature with 100 ml. of acetonitrile for 72 hours, the resulting solution containing an appreciable amount of transparent gel. When this was removed by filtration on a fritted glass funnel, the reduced viscosity of the filtrate was 0.80 at a temperature 30° C., and concentration of 0.176 gram per 100 ml. of solution.

*Example 11*

To a solution prepared by dissolving 1.00 gram of anhydrous stannic chloride in 100.0 grams of a polyoxyethylene glycol with an average molecular weight of about 6000 which had previously been heated to 125° C., there was added with stirring 38.0 grams of bis(3,4-epoxy-6-methylcyclohexylmethyl) adipate prepared as in Example 9. These amounts corresponds to a molar ratio of 5.8:1 of the diepoxy compound to polyoxyethylene glycol. The reaction mixture almost immediately formed a rubber-like, translucent mass which could not be further mixed by stirring. The product was maintained at a temperature of 125° C. for 18 hours and then allowed to cool to room temperature.

A sample of the hard, resilient reaction product weighing 0.4815 gram, when extracted for three days with 96.3 grams of acetonitrile by rotation on can rolls, gave a swollen sample weight of 1.3213 grams which, when dried to constant weight at 125° C. during approximately 18 hours, amounted to 0.1623 gram. This indicates that 33.7 percent of the product is acetonitrile-insoluble. Extraction of 0.5884 gram of the reaction product with 117.7 grams of water for three days gave a swollen sample weight of 1.8191 grams which upon drying yielded a water-insoluble portion amounting to 0.3738 gram, or 63.5 percent of the sample weight.

We claim:

1. A process for producing a high molecular weight polymeric product which comprises reacting at a temperature below 250° C. a polyoxyalkylene polyol having an average molecular weight of at least 600 with an organic cycloaliphatic diepoxy compound having two oxirane epoxy groups in which the oxirane oxygen is bonded to adjacent carbon atoms of a cycloaliphatic ring, in the presence of catalytic amounts of a member selected from the class of Friedel-Crafts catalysts and alkali metal alcoholates of the polyoxyalkylene polyol, wherein the initial polymeric product is formed by the condensation of hydroxyl groups of the said polyol with epoxy groups of the said diepoxy compound, and wherein the said diepoxy compound is present in amounts from about 0.2 mole to about 20 moles per mole of polyoxyalkylene polyol.

2. A process according to claim 1 wherein the polyoxyalkylene polyol is a polyoxyalkylene glycol having an average molecular weight between 1,000 and 10,000.

3. A process according to claim 1 wherein the diepoxy compound has the oxirane oxygen atoms bonded to adjacent carbon atoms of a cycloaliphatic ring containing from 5 to 6, inclusive, carbon atoms in the ring.

4. A process according to claim 1 wherein the catalyst is a Friedel-Crafts catalyst.

5. A process according to claim 4 wherein the polyoxyalkylene polyol is a polyoxyalkylene glycol having an average molecular weight between 1,000 and 10,000.

6. A process for preparing a water-soluble high molecular weight polymeric product which comprises reacting at a temperature below 250° C. a polyoxyalkylene glycol having an average molecular weight between 1,000 and 10,000 with from 0.2 to about 4 moles per mole of the polyoxyalkylene glycol of an organic cycloaliphatic diepoxy compound having two oxirane epoxy groups in which the oxirane oxygen is bonded to adjacent carbon atoms of a cycloaliphatic ring having from 5 to 6, inclusive, carbon atoms in the ring in the presence of catalytic amounts of a Friedel-Crafts catalyst, wherein the initial polymeric product is formed by condensation of hydroxyl groups of the polyoxyalkylene glycol with epoxy groups of the diepoxy compound.

7. A process according to claim 6 wherein the temperature is maintained between 50° and 150° C.

8. A process according to claim 6 wherein the diepoxide is bis(2,3-epoxycyclopentyl)ether.

9. A process according to claim 6 wherein the diepoxide is dicyclopentadiene diepoxide.

10. A process according to claim 6 wherein the diepoxide is a 3,4-epoxycyclohexylmethyl 3,4-epoxycyclohexane carboxylate.

11. A composition comprising (a) a polyoxyalkylene polyol having an average molecular weight of at least 600, (b) an organic cycloaliphatic diepoxy compound having two oxirane epoxy groups in which the oxirane oxygen is bonded to adjacent carbon atoms of a cycloaliphatic ring and (c) catalytic amounts of a member selected from the class of Friedel-Crafts catalysts and alkali metal alcoholates of the polyoxyalkylene polyol, wherein the diepoxy compound is present in the composition in amounts from about 0.2 mole to about 20 moles per mole of the polyoxyalkylene polyol.

12. A composition according to claim 11 wherein the polyoxyalkylene polyol is a polyoxyalkylene glycol having an average molecular weight between about 1,000 and 10,000.

13. A composition according to claim 11 wherein the diepoxy compound has the oxirane oxygen atoms bonded to adjacent carbon atoms of a cycloaliphatic ring containing from 5 to 6, inclusive, carbon atoms of the ring.

14. The polymeric product of the composition of claim 11 cured by heating to a temperature between about 25° C. and 250° C.

15. A composition comprising (a) a polyoxyalkylene glycol having an average molecular weight between about 1,000 and 10,000 (b) an organic cycloaliphatic diepoxy compound having two oxirane epoxy groups in which the oxirane oxygen is bonded to adjacent carbon atoms of a cycloaliphatic ring having from 5 to 6, inclusive, carbon atoms in the ring and (c) catalytic amounts of a Friedel-Crafts catalyst, wherein the diepoxy compound is present in the composition in amounts from about 0.2 to about 4 moles per mole of the polyoxyalkylene glycol.

16. A composition according to claim 15 wherein the diepoxy compound is bis(2,3-epoxycyclopentyl)ether.

17. A composition according to claim 15 wherein the diepoxy compound is dicyclopentadiene diepoxide.

18. A composition according to claim 15 wherein the diepoxy compound is a 3,4-epoxycyclohexylmethyl 3,4-epoxycyclohexane carboxylate.

19. The polymeric water-soluble product of the composition of claim 15 cured by heating to a temperature between 25° and 250° C.

20. The polymeric water-soluble product of the composition of claim 16 cured by heating to a temperature between 25° and 250° C.

21. The polymeric water-soluble product of the composition of claim 17 cured by heating to a temperature between 25° and 250° C.

22. The polymeric water-soluble product of the composition of claim 18 cured by heating to a temperature between 25° and 250° C.

References Cited by the Examiner

UNITED STATES PATENTS 2,718,509  9/55  Lunsted et al. _____ 260—2
2,739,161  3/56  Carlson _____ 260—2

JOSEPH L. SCHOFER, *Primary Examiner.*

M. LIEBMAN, *Examiner.*